(12) United States Patent
Sato

(10) Patent No.: US 11,526,312 B2
(45) Date of Patent: Dec. 13, 2022

(54) DEVICE MANAGEMENT APPARATUS, METHOD, AND PROGRAM STORAGE MEDIUM

(71) Applicant: CANON KABUSHIKI KAISHA, Tokyo (JP)

(72) Inventor: Yuichiro Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/352,092

(22) Filed: Jun. 18, 2021

(65) Prior Publication Data

US 2021/0405939 A1 Dec. 30, 2021

(30) Foreign Application Priority Data

Jun. 24, 2020 (JP) .............................. JP2020-108371

(51) Int. Cl.
*G06F 3/12* (2006.01)
*H04L 67/51* (2022.01)

(52) U.S. Cl.
CPC .......... *G06F 3/1231* (2013.01); *G06F 3/1204* (2013.01); *G06F 3/1287* (2013.01); *H04L 67/51* (2022.05)

(58) Field of Classification Search
None
See application file for complete search history.

(56) References Cited

U.S. PATENT DOCUMENTS

| 2015/0161066 | A1* | 6/2015 | Matsuda | G06F 21/44 710/4 |
| 2015/0172435 | A1* | 6/2015 | Choi | H04W 8/005 455/418 |
| 2020/0302085 | A1* | 9/2020 | Chiyo | G06V 40/172 |

FOREIGN PATENT DOCUMENTS

JP 2009190303 A 8/2009

* cited by examiner

*Primary Examiner* — Frantz Bataille
(74) *Attorney, Agent, or Firm* — Canon U.S.A., Inc. IP Division

(57) ABSTRACT

A device management apparatus has a providing means configured to provide a first screen for determining device specific information corresponding to a contract and a second screen for determining setting information to be distributed if a new device specified by the device specific information is detected; a search means configured to search a device via a network; and a distribution means configured to distribute the setting information that has been determined in the second screen according to a detection if a new device corresponding to the device specific information that has been determined in the first screen is detected by the search.

11 Claims, 10 Drawing Sheets

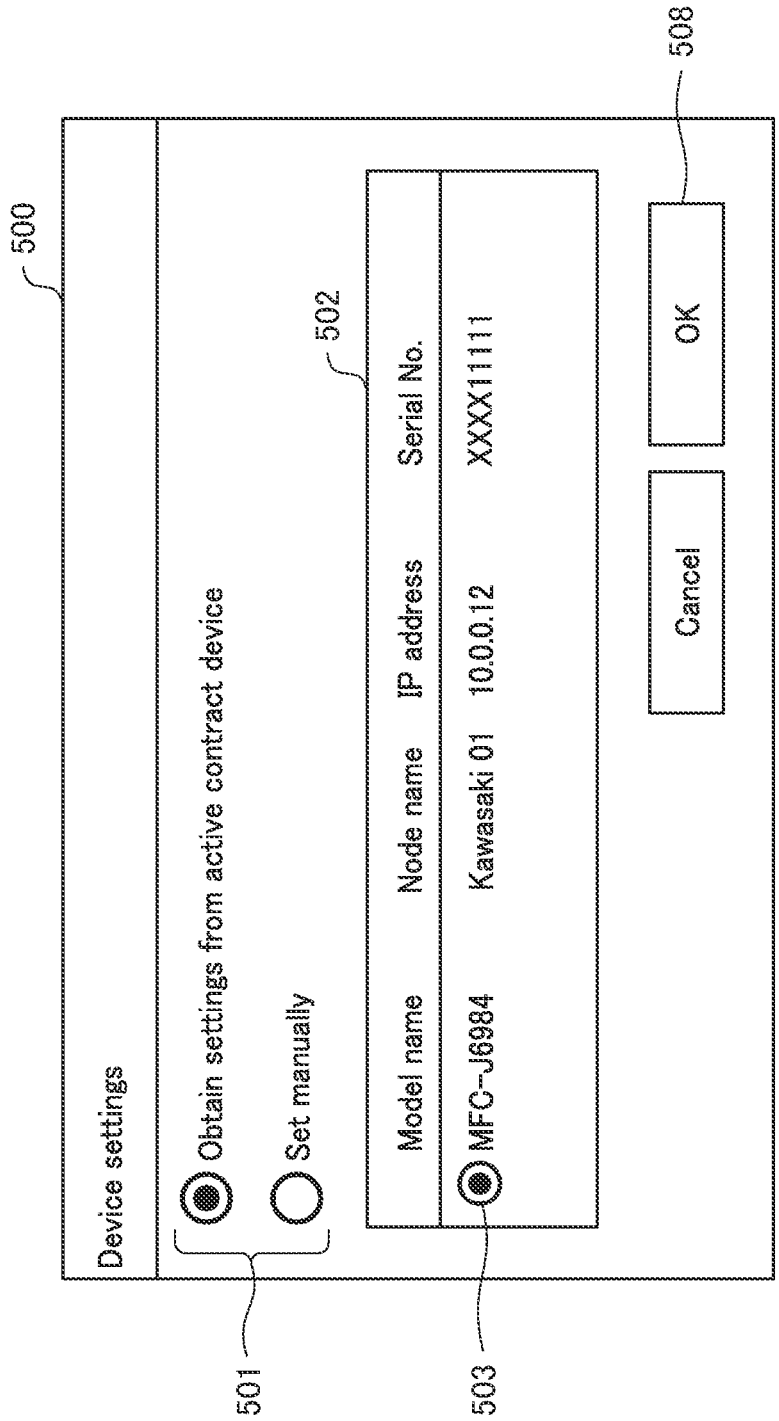

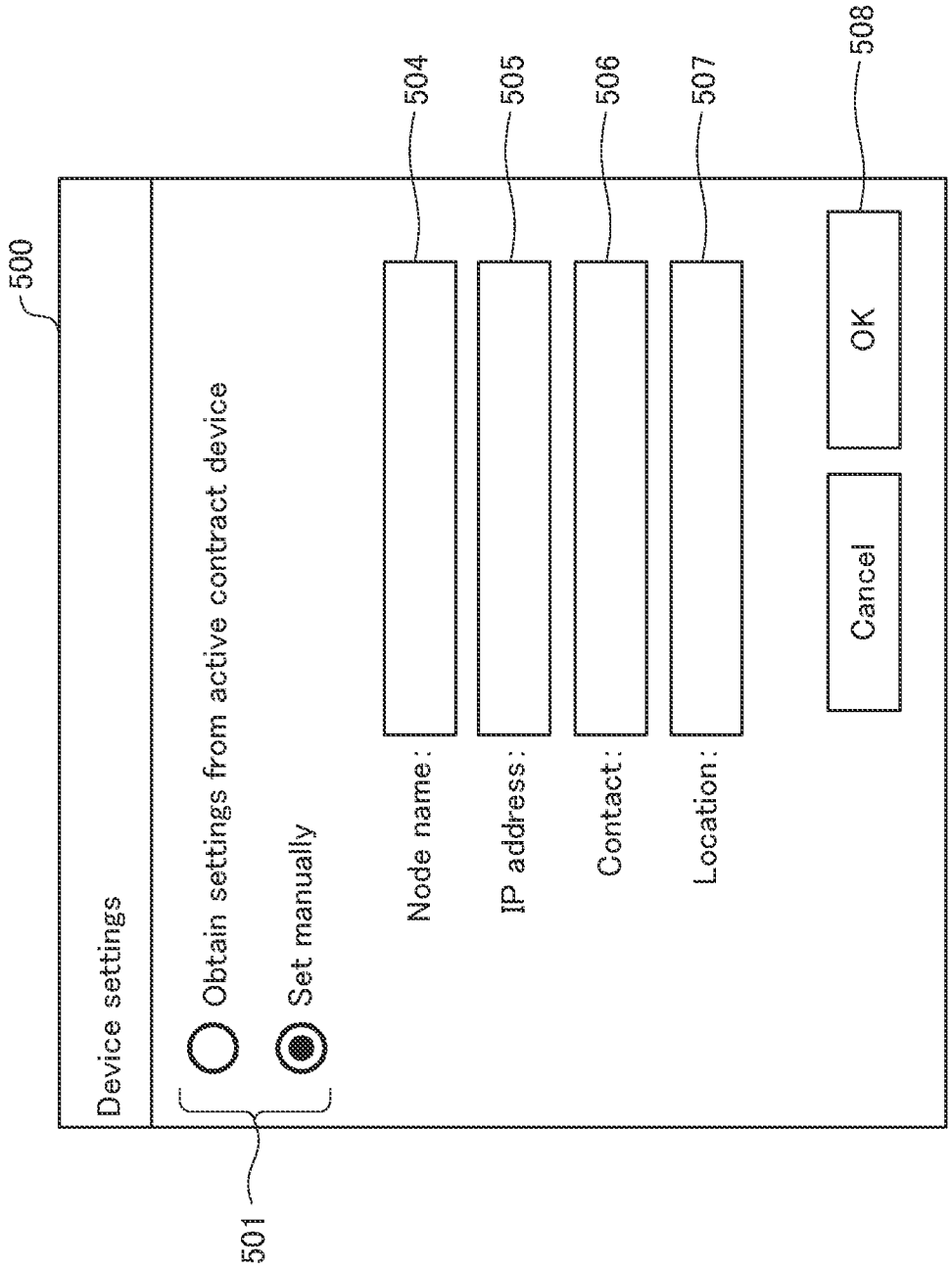

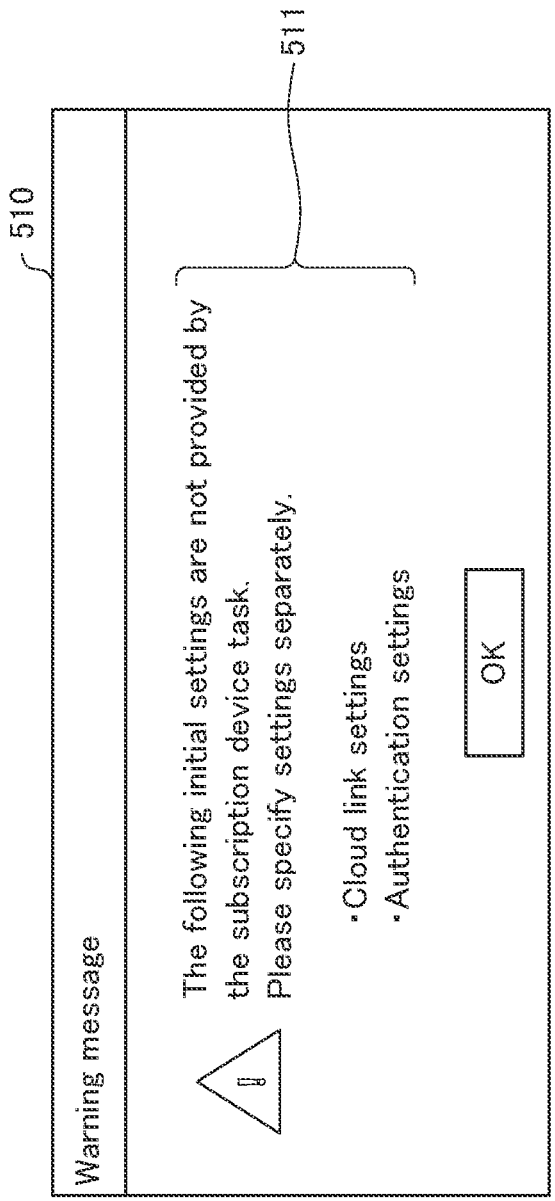

DEVICE MANAGEMENT APPARATUS, METHOD, AND PROGRAM STORAGE MEDIUM

BACKGROUND

Field of the Disclosure

The present disclosure relates to a device management apparatus, a method, and a program storage medium.

Description of the Related Art

In recent years, what is referred to, for example, as a "subscription contract business model", in which the use of a device for a contract term is guaranteed by a fixed payment, has been spreading.

In this type of business model, a user who is a licensee may use a device rented from a licensor without purchasing the device. If a failure occurs in the device, support may be provided in the form of the licensor sending an alternative device to the user and the user returning the faulty device.

In this context, as a method for performing the initial setting of an alternative device to replace the faulty device, for example, a method for obtaining settings from a printer already existing on the same network and setting these in a new printer has been proposed (for example, refer to Japanese Patent Application Laid-Open No. 2009-190303).

In replacing a faulty device with an alternative device, it is necessary to perform the initial settings to the alternative device to take over the setting of the faulty device. However, the setting operation is complicated for the user. Moreover, even a case is assumed in which, in the subscription contract business model, the faulty device of which settings are to be obtained does not exist on the network because the faulty device has been returned. Therefore, in the operation of the subscription contract business model, as a support to the user, there is a demand for a mechanism for reducing the setting operation during replacement of the faulty device with the alternative device.

SUMMARY

A device management apparatus according to embodiments of the present disclosure comprises: at least one memory storing instructions; and one or more processors configured to execute the instructions, which when executed by the one or more processors, cause the device management apparatus to: provide a first screen for determining device specific information corresponding to a contract, and a second screen for determining setting information to be distributed if a new device specified by the device specific information is detected; search a device via a network; and distribute the setting information that has been determined in the second screen according to a detection if a new device corresponding to the device specific information that has been determined in the first screen is detected by the search.

Further features of the present disclosure will become apparent from the following description of embodiments with reference to the attached drawings.

BRIEF DESCRIPTION OF THE DRAWINGS

FIGS. 6A to 6C illustrate display examples of the GUI of the device management application.

DESCRIPTION OF THE EMBODIMENTS

Hereinafter, an embodiment of the present disclosure will be described with reference to the drawings. However, not all of the features described in the following embodiment are necessarily essential to embodiments of the present disclosure.

<System Configuration>

Figure 1:
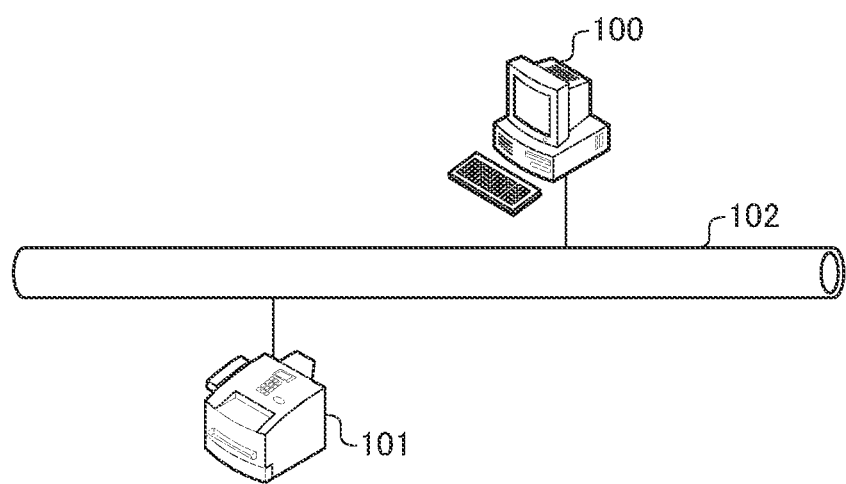
FIG. 1 illustrates a configuration example of a device management system according to the present embodiment.

FIG. 1 illustrates a configuration example of a device management system including a device management apparatus of the present embodiment.

The device management system includes a PC (Personal Computer) 100 and a device 101. Although FIG. 1 illustrates an example in which the device management system includes one device 101, the number of devices 101 included in the device management system may be two or more.

The PC 100 and the device 101 are connected through a network 102. The network 102 is, for example, a communication network, for example, the Internet, and any configuration, for example, a LAN, a WAN, a telephone line, or a wireless communication line, may be adopted if data can be transmitted and received.

The PC 100 is an example of the device management apparatus, and is an information processing apparatus in which a device management application 300 to be described below, which functions in an operating system (OS) (not illustrated), has been installed.

The PC 100 uses the device management application 300 to obtain device information of the device 101 connected to the PC 100 from the device 101. The obtained device information of the device 101 is displayed by a GUI (Graphical User Interface) of the device management application 300. The device information of the device 101 includes a device status showing the occurrence of an error of the device 101 and information about a model name, a serial number, an IP address, and a location.

Additionally, the PC 100 can update the device information of the device 101 by using the device management application 300 to request the device 101 to update the device information.

The device 101 is a network device to be managed by the PC 100 and, as an example, is configured as an image forming apparatus, for example, a printer, a copying machine, a digital multifunction device, or a three dimensional printer. If the device 101 is an image forming apparatus, the device 101 can be provided with functions such as a printing function, a FAX function, a copying function, a scanning function, and a file transmission function.

When the device 101 receives an obtaining request for the device information from the device management application 300, the device 101 transmits its own device information.

When the device 101 receives an update request of the device information, the device 101 updates its own device information.

Here, the device 101 includes a device provided under a contract (subscription contract) guaranteeing the use of the device 101 within a contracted time period with a fixed payment. In the device 101 provided under the subscription contract (hereinafter, also referred to as a "subscription device"), there are cases in which, if a failure or the like occurs in a device rented by a user, the use of the device during the contracted time period is guaranteed by replacing the device with an alternative device. In the replacement of the subscription device, the device information related to the device 101 after replacement needs to be reset in the device management system. The subscription device before replacement is an example of the first device, and the subscription device after replacement is an example of the second device.

<Hardware Configuration>

Next, a hardware configuration of the PC 100 and the device 101 will be described.

Figure 2A:
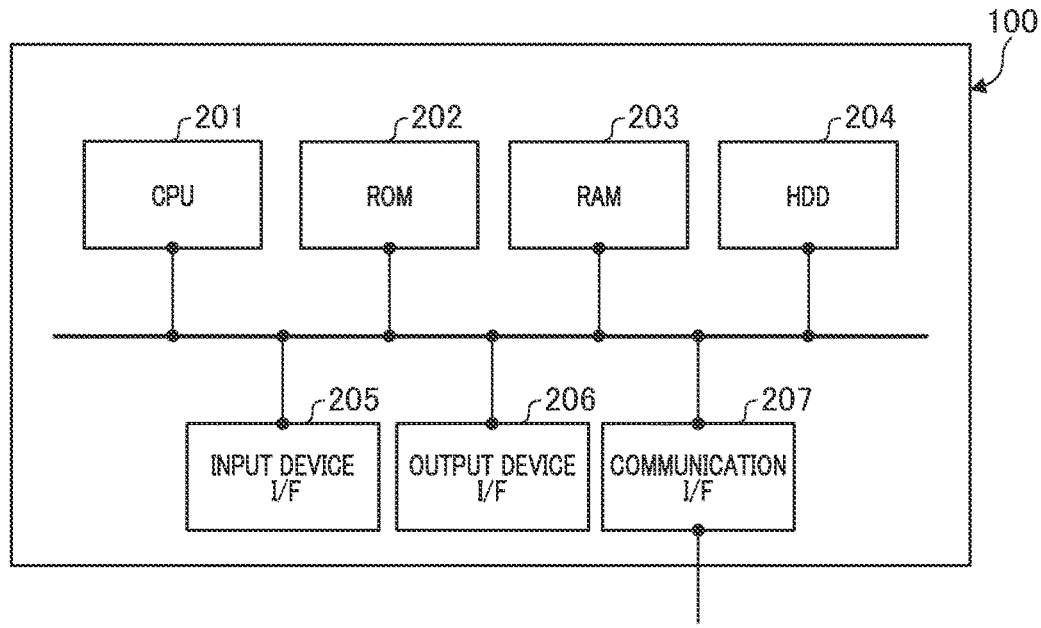
FIG. 2A illustrates an example of a hardware configuration of a PC.

FIG. 2A is a block diagram illustrating an example of the hardware configuration of the PC 100. The PC 100 is provided with a CPU 201, a ROM 202, a RAM 203, an HDD 204, an input device I/F 205, an output device I/F 206, and a communication I/F 207. These components are connected to each other via a bus.

"CPU" is an abbreviation for "Central Processing Unit", and "ROM" is an abbreviation for "Read Only Memory". "RAM" is an abbreviation for "Random Access Memory", and "HDD" is an abbreviation for "Hard Disk Drive".

The CPU 201 is a processor that performs various types of calculation processing in accordance with a program stored in the ROM 202 or the RAM 203. The ROM 202 is a nonvolatile storage region in which a program, for example, a BIOS, is stored. The RAM 203 is a volatile storage region and is used as a temporary storage region when the CPU 201 performs various types of calculation processing.

The HDD 204 is a nonvolatile large-volume storage medium and can store an OS and a program for achieving various functions of the device management application 300. Instead of the HDD 204, a solid-state drive (SSD) may be used.

The input device I/F 205 is connected to an input device (not illustrated) and is an interface for receiving an input from the input device. Examples of the input device include a keyboard and a pointing device. The input device may be incorporated in the PC 100 or may be configured as an external device.

The output device I/F 206 is connected to an output device (not illustrated) and is an interface for performing an output to the output device. Examples of the output device include a display device, for example, a liquid crystal display. The output device may be incorporated in the PC 100 or may be configured as an external device.

The communication I/F 207 is an interface for performing communication with an external device. The communication I/F 207 is connected to the network 102 and functions to carry out data communication with the device 101 via the network 102.

In the PC 100, the BIOS is executed by the CPU 201 after startup and the OS is loaded from the HDD 204 to the RAM 203 so that the OS can be executed. The CPU 201 loads a software module to be described below from the HDD 204 to the RAM 203 in accordance with the operation of the OS so that the software module can be executed at any time.

Subsequently, the loaded software module operates by executing a program of the CPU 201. The communication I/F 207 is controlled by the CPU 201 in accordance with the operation of the OS and communicates with the device 101.

Figure 2B:
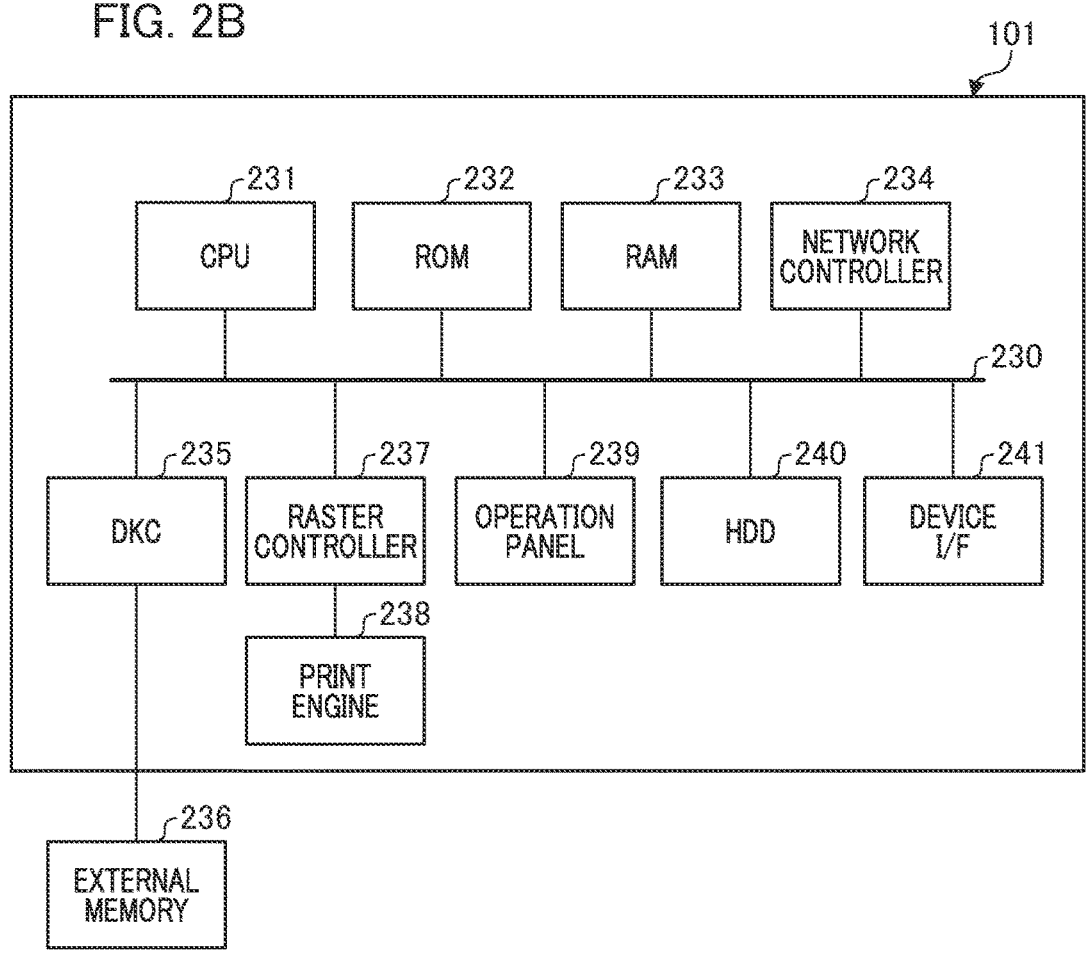
FIG. 2B illustrates an example of a hardware configuration of a device.

FIG. 2B is a block diagram illustrating an example of the hardware configuration of the device 101. The device 101 has a function related to printing and a function related to communication with the PC 100 and the like.

The device 101 is provided with a CPU 231, a ROM 232, a RAM 233, a network controller 234, a DKC (disk controller) 235, a raster controller 237, an operation panel 239, an HDD 240, and a device I/F 241. These components are connected to each other via a system bus 230. The device 101 is further provided with a print engine 238 connected to the raster controller 237. In the device 101, the units other than the print engine 238 may be referred to as a controller that controls the control system of the image forming apparatus.

The CPU 231 is a processor that comprehensively controls each of the components connected to the system bus 230 and controls the entire device 101. The ROM 232 is a nonvolatile storage region in which a control program and the like executed by the CPU 231 are stored. The RAM 233 is a volatile storage region and is used as a temporary storage region when the CPU 231 performs various types of calculation processing.

The network controller 234 is an interface for communicating with an external device and is configured by, for example, a network interface card (NIC). The network controller 234 is connected to the network 102 and functions to carry out data communication with the PC 100 via the network 102.

The DKC 235 is connected to an external memory 236 and has a function of reading a control program and resource data (resource information) stored in the external memory 236.

The raster controller 237 has a function for converting print data described in, for example, PDL (Page Description Language) into image data. The print engine 238 forms an image based on the image data input from the raster controller 237 on a recording medium. For example, the print engine 238 is an electrophotographic printing device and includes an exposure unit, a transfer unit, and a fixing unit. Alternatively, the print engine 238 may be a printing device, for example, an ink jet printing device and a printing device using a sublimation (thermal transfer) method.

The operation panel 239 is a module that functions as a user interface of the device 101. The operation panel 239 includes a switch or a touch panel that receives an operation by a user and an LED display that displays a screen. The operation panel 239 receives, for example, a setting operation of an operation mode of the device 101 and the like, and a specifying operation of contents to be printed and displays an operation state of the device 101.

The HDD 240 is a nonvolatile large-volume storage medium that stores, for example, an application program of the device 101. The device I/F 241 is a connection I/F to an external device connected to the device 101. The device I/F 241 controls communication with an external device in accordance with a serial communication standard, for example, USB (Universal Serial Bus).

<Software Configuration>

Figure 3:
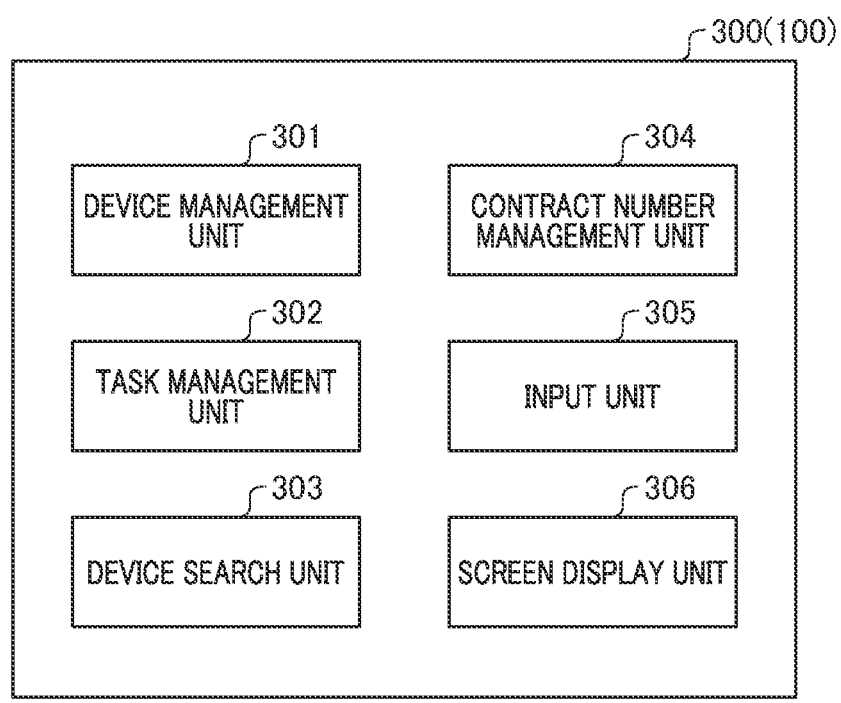
FIG. 3 illustrates an example of a software configuration of the PC.

FIG. 3 is a block diagram illustrating an example of a software configuration of the device management application 300 executed by the PC 100.

The device management application 300 includes, as a software module, a device management unit 301, a task management unit 302, a device search unit 303, a contract number management unit 304, an input unit 305, and a screen display unit 306. Here, the operation of each element of the device management application 300 is realized by the CPU 201 executing the program of the device management application 300. The device management application 300 has a function of distributing setting information to the device 101.

The device management unit 301 manages the device information of the device 101 to be managed by the device management application 300. Here, the device 101 to be managed is a device 101 on the network 102 that has been detected by a device search to be disclosed below and is a target of display on the device management application 300. Table A below shows an example of a portion of the device information managed by the device management unit 301. The device information includes information about a serial number, a model name, a node name, an IP address, a location, and a contact.

TABLE A

| Serial Number | Model Name | Node Name | IP Address | Location | Contact |
|---|---|---|---|---|---|
| XXXX1111 | MFC-L9684 | Kawasaki 01 | 10.0.0.12 | Kawasaki branch | 0441234567 |
| YYYY1111 | MFC-L7580 | Yokohama 01 | 10.0.1.100 | Yokohama branch | 0451234567 |
| ZZZZ1111 | MFC-L7000 | Yokohama 02 | 10.0.1.101 | Yokohama branch | 0451234567 |

The serial number is an identification number uniquely assigned to each of the devices 101. The device management application 300 can identify each of the devices 101 by the serial number.

The model name is information indicating the model name of the device 101 (device type). The device management application 300 handles devices having the same model name as the devices 101 having the same function and specifications.

The node name is information set by the user for individually identifying the devices 101 and includes an identification name (for example, Kawasaki 01) assigned to the device 101 by the user.

The IP address indicates an IP address assigned to the device 101. The device management application 300 sets an address of a communication destination based on the IP address in communication with the device 101 when the device information and the status information have been obtained.

The location is information set by the user for identifying the installation location of the device 101 and includes a name (for example, the Kawasaki Branch) indicating the installation location of the device 101. The contact is information set by the user for identifying contact information for inquiry about the device 101 and includes contact details (for example, a telephone number).

Although the device information of the present embodiment includes a node name, a location, and a contact as the information that can be set by the user, the device information may include other information to serve as information that can be set by the user.

The task management unit 302 manages task information and application processing information of a device search task registered in advance by the user.

The device search task described above is task processing executed for the device 101 newly detected by a device search to be described below. In the device search task, filter conditions for determining the device 101 to be managed (for example, matching of a model name or an IP address) and application processing (for example, reflection of the initial settings) executed when a device that matches the filter conditions has been detected are defined.

Table B below shows an example of a portion of the task information managed by the task management unit 302. The task information includes information about a task ID, a task name, a model name filter, an IP address filter, and an application processing ID.

TABLE B

| Task ID | Task Name | Model Name Filter | IP Address Filter | Application Processing ID |
|---|---|---|---|---|
| T0001 | Subscription Task 1 | MFC-J6984, MFC-L7580 | 10.0.0.* | A0001 |

The task ID is information for uniquely identifying the task information. The task name is information set by the user to identify the device search task and includes an identification name (for example, subscription task 1) assigned to the task by the user.

The model name filter is an example of the device specific information for specifying the device 101 to be a target for task processing. When the device 101 having a model name that matches the model name of the model name filter is detected, the device management application 300 uses the device 101 as a target for the application processing to be described below. When a plurality of model names is described in the filter conditions in the model name filter, the model names are listed by inserting commas between the model names. Table B shows an example in which two model names are listed as the filter conditions of the model name filter.

The IP address filter is an example of the device specific information for specifying the device 101 to be a target for the task processing. When the device 101 having an IP address that matches the IP address filter is detected, the device management application 300 uses the device 101 as a target for the application processing to be described below. Table B shows an example in which the filter condition of the IP address filter is described by a regular expression using "*".

The model name filter and the IP address filter are applied by using the logical product (AND condition). That is, the device management application 300 uses the device 101 that satisfies the detection conditions of both the model name filter and the IP address filter as a target for the application processing to be described below.

The application processing ID is information that defines the application processing to be applied to the device 101 when the device 101 to be a target for the task processing has been detected. The application processing ID includes identification information (for example, A0001) uniquely indicating the application processing information.

Although the model name and the IP address are shown as examples of the filter conditions of the task information of the present embodiment, the filter conditions of the task information are not limited to those described above, and other filter conditions may be used if the device 101 can be specified. For example, a MAC address may be added as a filter condition of the task information, or the filter condition of the task information may be only a model name.

Table C below shows an example of a portion of the application processing information managed by the task management unit 302. The application processing information is information distributed for the use in the initial settings of the device 101 when a device that matches the filter condition of the task information has been detected. The application processing information includes information about an application processing ID, a node name, an IP address, a location, and a contact. Among the information, the information about the node name, the IP address, the location, and the contact are examples of the setting information.

TABLE C

| Application Processing ID | Node Name | IP Address | Location | Contact |
|---|---|---|---|---|
| A0001 | Kawasaki 01 | 10.0.0.2 | Kawasaki branch | 044-123-4567 |

The application processing ID is identification information (for example, A0001) uniquely indicating the application processing information. The application processing ID can link the task information in Table B and the application processing information in Table C.

The node name of the application processing information stores the information of the node name that is initially set in the device 101 when the device 101 corresponding to the filter condition of the task information has been detected. The IP address of the application processing information stores the information of the IP address that is initially set in the device 101 when the device 101 corresponding to the filter condition of the task information has been detected. The location of the application processing information stores the information of the location that is initially set in the device 101 when the device 101 corresponding to the filter condition of the task information has been detected. The contact information of the application processing information stores the contact information that is initially set in the device 101 when the device 101 corresponding to the filter condition of the task information has been detected.

The information included in the application processing information of the present embodiment is not limited to the above, and may include information about other items that can be set for the device 101, such as an administrator password and toner saving setting.

The device search unit 303 is an example of a search means and has a function of searching the device 101 operating on a network. The device search performed by the device search unit 303 is executed when the device management application 300 is started or when an instruction for manual search by the user is received.

The device search unit 303 executes a device search task on the device 101 newly detected by the device search. Here, the newly detected device 101 is a device 101 that is not included in the target for the management of the device management unit 301.

The device search by the device search unit 303 is processed in, for example, the following flow. First, the device search unit 303 transmits a broadcast packet of SNMPv1 (Simple Network Management Protocol version 1). Then, the device 101 responds to the SNMPv1 request from the device search unit 303. The device search unit 303 additionally obtains device information to be used in the device management application 300 from the device 100 that has responded to the response. Thereby, the device 101 is newly detected.

When the device search unit 303 newly detects the device 101, it determines whether or not the detected device 101 matches the filter conditions of the task information. When the device 101 that has been detected matches the filter conditions of the task information, the device search unit 303 refers to an application processing ID of the matching record in the task information. Subsequently, the device search unit 303 performs the initial settings of the application processing information linked to the application processing ID to the newly detected device 101.

The device search unit 303 periodically obtains the device information from the device 101 to be managed in the device management unit 301. Subsequently, the device search unit 303 updates the device information of the device 101 to be managed via the device management unit 301. The device information may be obtained by another means. For example, a notification about the device information may be provided to the device management application 300 from the device 101 side. Alternatively, a server (not illustrated) that manages the device 101 may be provided and the device information collected by the server may be obtained from the server.

The contract number management unit 304 manages a contract number of a subscription contract and a model name of the object of a contract linked to the contract number to serve as contract number information.

In the subscription contract, although, typically, a model that can be used for each contract number has been determined, the user does not know the exact model name in many cases even if the user knows the contract number. Accordingly, in the present embodiment, it is possible to obtain the corresponding model name from the contract number in the device search task that performs the initial settings of the subscription device (hereinafter, also referred to as a "subscription device task"). Thus, the model name filter of the task information can be easily and accurately set in the subscription device task.

Table D below shows an example of a portion of the contract number information managed by the contract number management unit 304. The contract number information includes each item of information about a contract number and a model name of the object of a contract.

TABLE D

| Contract Number | Model Name of Object of Contract |
|---|---|
| AAAA00001 | MFC-J6984, MFC-L7580 |
| AAAA00002 | MFC-L7000 |

The contract number is a contract number of the subscription contract and is issued to the user for each subscription contract.

The model name of the object of a contract is information indicating the model names of the devices corresponding to the above contract numbers. In replacement of the subscription contract device due to a failure or the like, the model of the device 101 to be replaced is a model having a model name of the object of a contract. In the present embodiment, if there are a plurality of models of the object of a contract, which are linked to contract numbers, a plurality of model names is described in the model name of the object of the contract. In this case, a plurality of model names may be described in the model name of the object of a contract with commas, or the model names of the object of a contract may be described with another symbol for separating words or may be described in array format.

The above contract number information is stored in, for example, the HDD 204 as a contract number information file. The contract number information may be stored by another means. For example, the device management application 300 may obtain the contract number information as necessary from a server (not illustrated) that manages the contract number information.

The input unit 305 receives an operation from the user through a GUI of the device management application 300 displayed by the screen display unit 306 and obtains the operation information of the user. The screen display unit 306 is an example of a providing means and performs screen display control related to the GUI of the device management application 300.

<GUI for the Device Management Application>

Figure 4A:
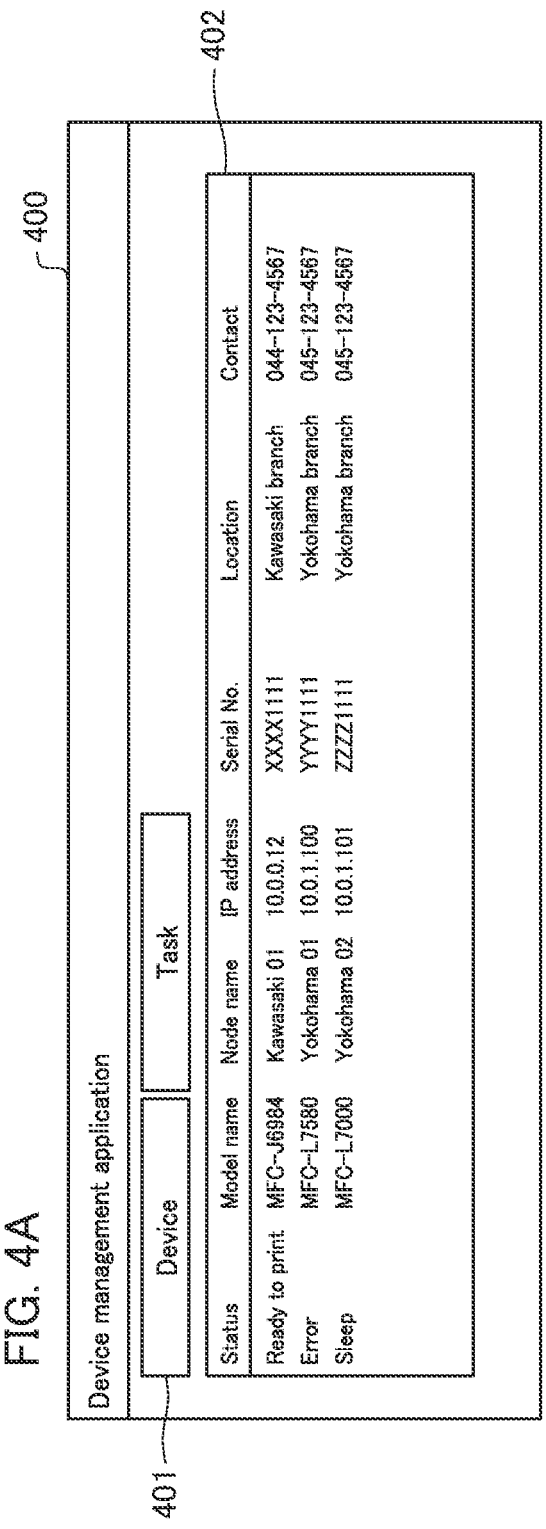
FIGS. 4A and 4B illustrate display examples of a GUI of a device management application.
Figure 4B:
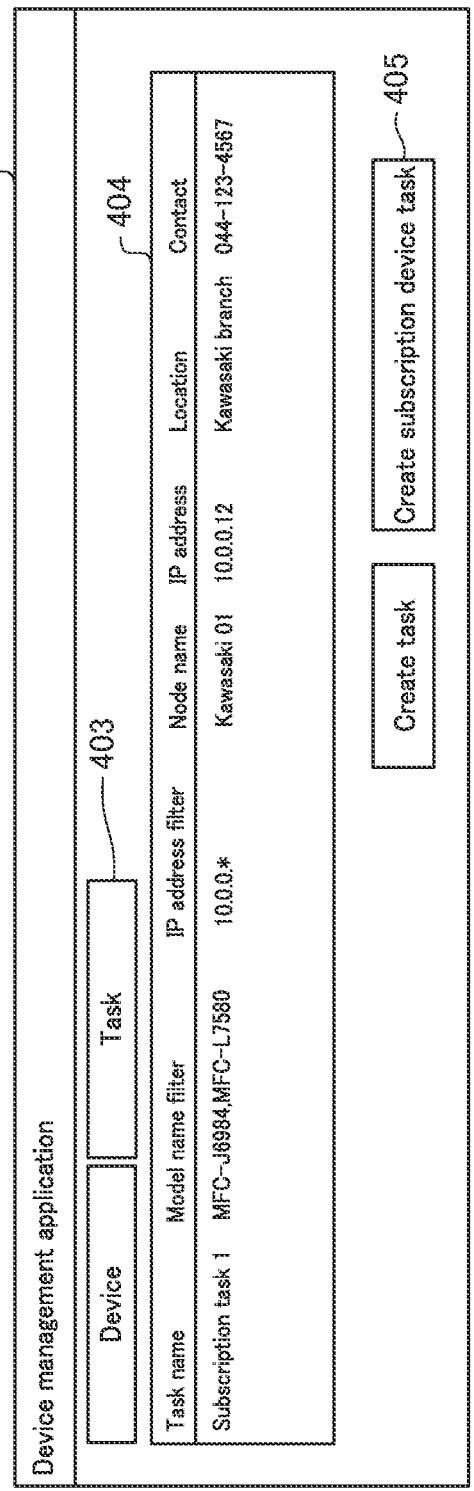
Figure 5:
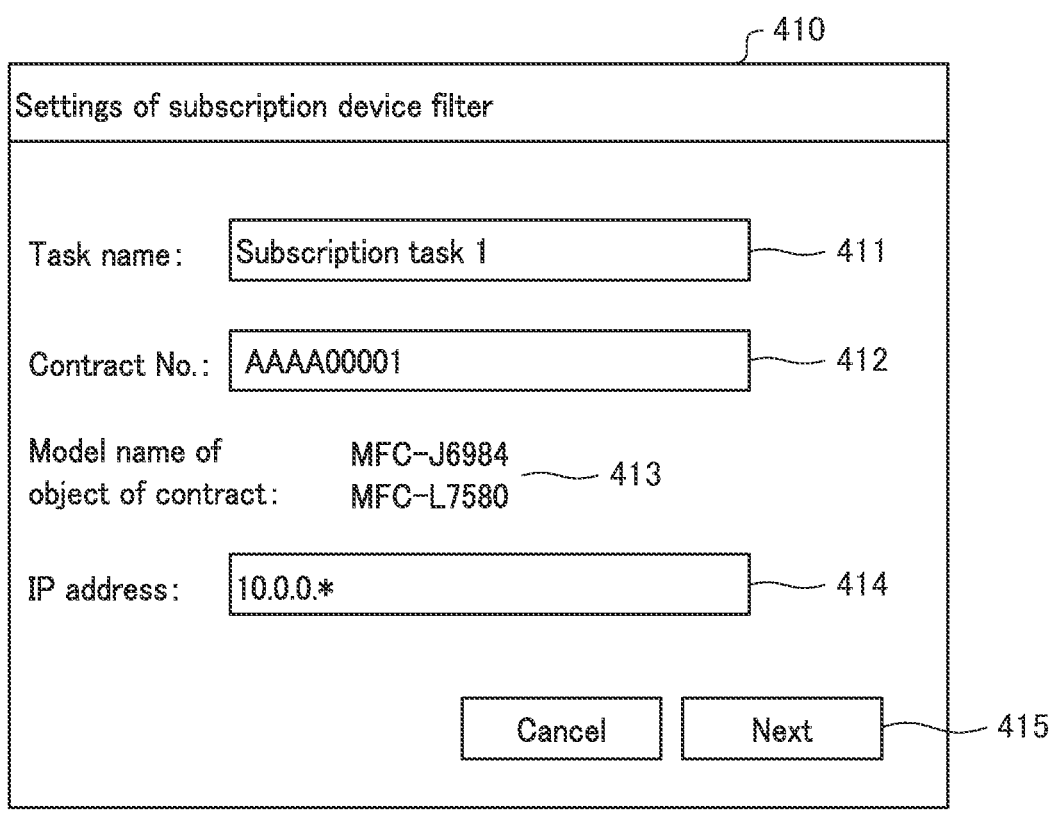
FIG. 5 illustrates a display example of the GUI of the device management application.

FIG. 4 to FIG. 6 illustrate an example of the GUI of the device management application 300. The GUI of the device management application 300 is controlled by the input unit 305 and the screen display unit 306. The screen of the GUI is displayed on, for example, the display device of the PC 100 via the output device I/F 206 of the PC 100. If the device management application 300 is implemented as a web-based application, the input/output by the GUI can also be used via the Web browser.

FIGS. 4A and 4B illustrate examples of the screen display of the GUI 400 of the device management application 300. FIG. 4A illustrates a screen when a device tab 401 is selected on the GUI 400 and FIG. 4B illustrates a screen when a task tab 403 is selected on the GUI 400.

As shown in FIG. 4A, when the device tab 401 is selected on the GUI 400, the device management application 300 displays a device list 402 on the GUI 400.

The device list 402 displays a list of the devices 101 managed by the device management application 300. On the device list 402, the current status of the devices 101 and the device information are displayed in association with each other for each of the devices 101. The items displayed in the device list 402 correspond to the device information managed by the device management unit 301 (for example, a model name, a node name, an IP address, a serial number, a location, and a contact). The display of the device list 402 may include other items such as the remaining amount of toner.

As shown in FIG. 4B, when the task tab 403 is selected on the GUI 400, the device management application 300 displays a task list 404 and a subscription device task creation button 405 on the GUI 400.

The task list 404 displays a list of task information and application processing information managed by the task management unit 302. On the task list 404, for example, the list of each item of information (for example, a task name, a model name filter, an IP address filter, a node name, an IP address, a location, and a contact) obtained by combining Tables B and C is displayed.

The subscription device task creation button 405 is a button for receiving an instruction for creating a subscription device task. When the subscription device task creation button 405 is pressed, the device management application 300 transitions the screen to a subscription device filter setting screen 410 (FIG. 5) for starting the creation of the subscription device task.

Next, a description will be given of an example of an operation related to the creation of the subscription device task in the GUI of the device management application 300. For example, when the subscription device is replaced with an alternative device due to a failure or the like, a need to reset the device information of the device 101 that has been replaced arises. The load for setting the device information of the device 101 that has been replaced can be saved by registering the subscription device task in advance and executing the subscription device task when the device is replaced with an alternative device.

FIG. 5 illustrates an example of the subscription device filter setting screen 410 using the GUI of the device management application 300. The screen 410 is an example of the first screen and includes the display of a task name 411, a contract number 412, a contract object model name 413, an IP address 414, and a next button 415.

The item of the task name 411 receives an input of a task name of task information (for example, subscription task 1). The input task name is managed as the task information by the task management unit 302.

The item of the contract number 412 receives an input of the contract number of the subscription contract (for example, AAAA00001). The item of the contract object model name 413 displays a contract object model name (for example, MFC-J 6984 and MFC-L 7580) corresponding to the contract number of the subscription contract. When the contract number 412 is input, the device management application 300 refers to the contract number information of the contract number management unit 304 (Table D). The device management application 300 displays the contract object model name 413 corresponding to the contract number 412 on the screen 410. The model name of the contract object model name 413 is managed by the task management unit 302 as a model name filter of the task information.

The item of the IP address 414 receives an input of the IP address filter (for example, 10.0.0.*). The IP address filter that has been input is managed by the task management unit 302 as an IP address filter of the task information.

The NEXT button 415 is a button for advancing a setting operation of the subscription device task. When the NEXT button 415 is pressed, the device management application 300 transitions the screen to a device setting screen 500 (FIGS. 6A and 6B).

FIGS. 6A and 6B illustrate an example of the device setting screen 500 using the GUI of the device management application 300. The device setting screen 500 is an example of the second screen and receives an input of the application processing executed on a new device found in the device search. The device setting screen 500 includes a radio button that receives the specification of "Obtain settings from an active contract device" or "Set manually" in a setting method 501.

When "Obtain settings from an active contract device" is specified in the setting method 501 of the device setting screen 500, the device management application 300 displays the device setting screen 500 of FIG. 6A. The device setting screen 500 of FIG. 6A includes a device list 502, a radio button 503, and an OK button 508.

The device list 502 displays a device that matches both the model name of the model name filter and the IP address of the IP address filter from among the devices 101 included in the device information. The device list 502 also displays information about the model name, the node name, the IP address, and the serial number, which are linked to the device 101.

The radio button 503 is a button that receives a specification of the device 101 displayed in the device list 502. The OK button 508 of FIG. 6A receives an operation of adding the device information of the specified device 101 to serve as the application processing information. In FIG. 6A, when the OK button 508 is pressed, the device management application 300 obtains the device information of the device 101 that has been specified to serve as the application processing information and manages it in the task management unit 302.

In contrast, when "Set manually" is specified in the setting method 501 of the device setting screen 500, the device management application 300 displays the device setting screen 500 of FIG. 6B. The device setting screen 500 of FIG. 6B includes the display of a node name 504, an IP address 505, a contact 506, a location 507, and the OK button 508.

The item of the node name 504 receives a new input of the node name. The item of the IP address 505 receives a new input of the IP address. The item of the contact 506 receives a new input of the contact. The item of the location 507 receives a new input of the location. The OK button 508 of FIG. 6B receives an operation of adding the information input in the node name 504, the IP address 505, the contact 506, and the location 507 to serve as the application processing information. In FIG. 6B, when the OK button 508 is pressed, the device management application 300 obtains the input information to serve as the application processing information and manages the information in the task management unit 302.

FIG. 6C illustrates an example of a warning message screen 510 displayed on the GUI in response to the pressing of the OK button 508. The warning message screen 510 includes a message 511 showing, for example, an item that cannot be set when the subscription device task is registered. As an example, the message 511 indicating that cloud link settings and authentication settings cannot be performed is displayed on the warning message screen 510 of FIG. 6C. Note that the warning message screen 510 may present other restrictions in the subscription device task to the user.

As described above, the settings of the subscription device task on the subscription device filter setting screen 410 and the device setting screen 500 are provided as a wizard-type user interface in which the process proceeds interactively in accordance with the user's selections.

<Registration Processing of the Subscription Device Task>

Figure 7:
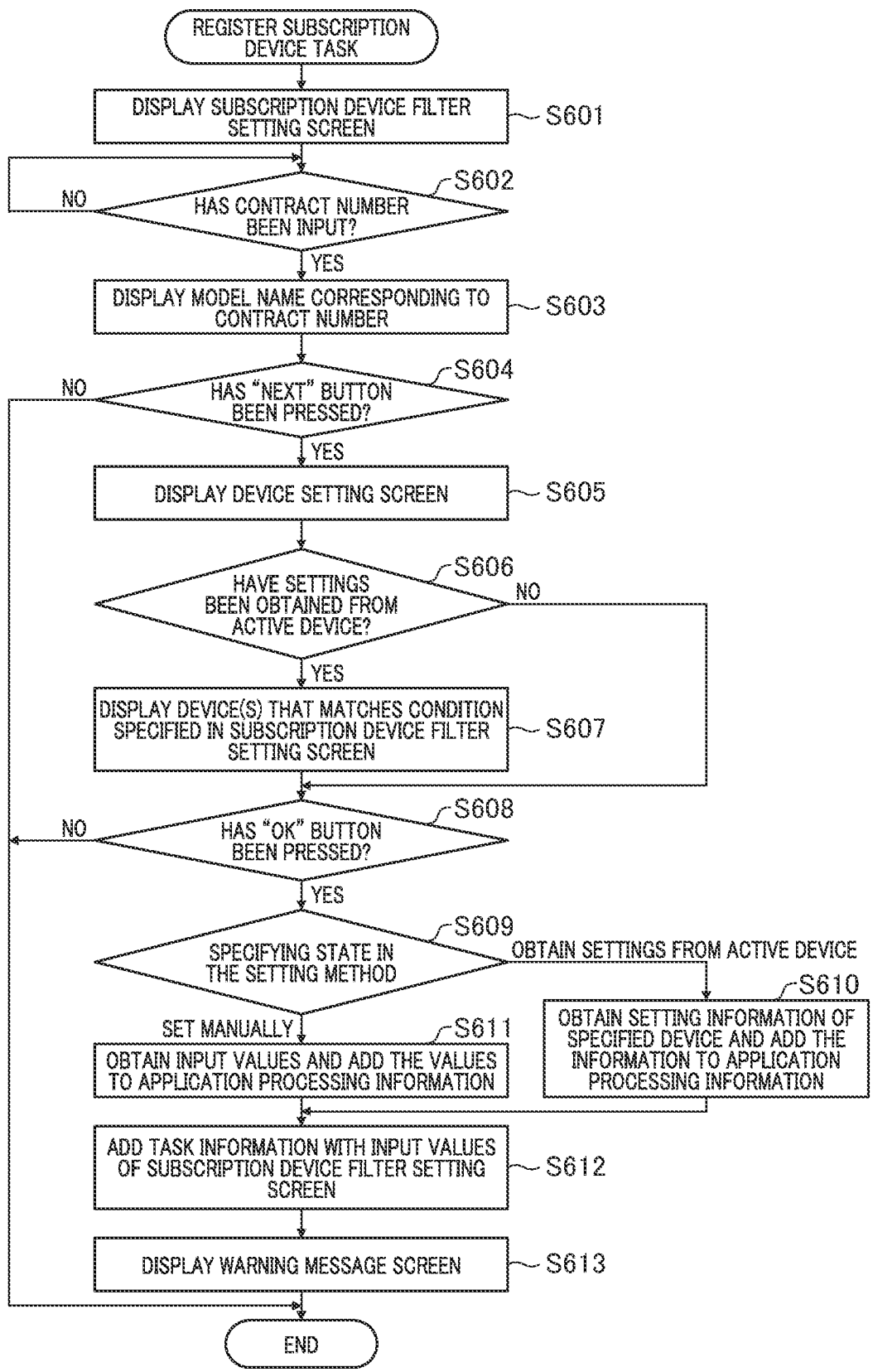
FIG. 7 is a flow chart illustrating an example of the registration process of a subscription device task.

FIG. 7 is a flow chart illustrating an example of the registration processing of the subscription device task. The process of FIG. 7 starts on the screen of the GUI 400 of FIG. 4B in response to the pressing of the subscription device task creation button 405.

In S601, when the device management application 300 receives the pressing of the subscription device task creation button 405, it displays the subscription device filter setting screen 410 via the screen display unit 306.

In S602, the device management application 300 determines whether or not the contract number of the subscription contract has been input in the item of the contract number 412 on the screen 410 via the input unit 305. If the contract number has been input, the process proceeds to S603. In contrast, if the contract number has not been input, the device management application 300 waits for the input of the contract number.

In S603, the contract number management unit 304 obtains information about a model name of the object of a contract corresponding to the contract number that has been input by using the contract number information (Table D). Subsequently, the screen display unit 306 displays a model name of the object of a contract corresponding to the contract number, in the item of the contract object model name 413 on the screen 410.

In S604, the device management application 300 determines whether or not the pressing of the NEXT button 415 has been received via the input unit 305. When the NEXT button 415 has been pressed, the process proceeds to S605.

In contrast, when the NEXT button 415 has not been pressed, for example, when a cancel button has been pressed, the process of FIG. 7 ends.

In S605, the device management application 300 displays the device setting screen 500 via the screen display unit 306.

In S606, the device management application 300 determines the specifying state in the setting method 501 of the device setting screen 500. Specifically, the device management application 300 determines whether or not "Obtain the settings from the active contract device" has been specified in the setting method 501. If "Obtain the settings from the active contract device" has been specified, the process proceeds to S607. In contrast, if "Set manually" has been specified, the process proceeds to S608.

In S607, the device management unit 301 extracts the device 101 that matches both the model name of the model name filter (contract object model name 413) and the IP address 414 of the IP address filter from the device information. Subsequently, the screen display unit 306 displays the device 101 extracted by the device management unit 301 on the device list 502 of the device setting screen 500.

In S608, the device management application 300 determines whether or not the pressing of the OK button 508 has been received via the input unit 305. When the OK button 508 has been pressed, the process proceeds to S609. In contrast, when the OK button 508 has not been pressed, for example, when the cancel button has been pressed, the process in FIG. 7 ends.

In S609, the device management application 300 determines the specifying state in the setting method 501 of the device setting screen 500. If "Obtain the settings from the active contract device" has been specified in the setting method 501, the process proceeds to S610. In contrast, if "Set Manually" has been specified in the setting method 501, the process proceeds to S611.

In S610, the task management unit 302 obtains the device information for the device 101 specified by the radio button 503 in the device list 502 from the device management unit 301. Subsequently, the task management unit 302 newly adds the device information (a node name, an IP address, a location, and a contact) that has been obtained from the device management unit 301 to serve as the application processing information. Subsequently, the process proceeds to S612.

In S611, the task management unit 302 newly adds the input values of the node name 504, the IP address 505, the contact 506, and the location 507 on the device setting screen 500 to serve as the application process information.

In S612, the task management unit 302 links each of the items of information about the task name 411, the contract object model name 413, and the IP address 414 input on the screen 410 to the application processing ID of the application processing information added in S610 or S611 to generate new task information. The newly generated task information of the subscription device task is managed by the task management unit 302.

In S613, the screen display unit 306 displays the warning message screen 510. Subsequently, the process of FIG. 7 ends. The notification about the warning message provided to the user is not limited to the display of the warning message screen 510 and may be provided, for example, by the delivery of an e-mail. If the notification about the warning message is not necessary, the process in S613 may be skipped. The description of FIG. 7 ends.

<Execution Processing of Subscription Device Task>

Figure 8:
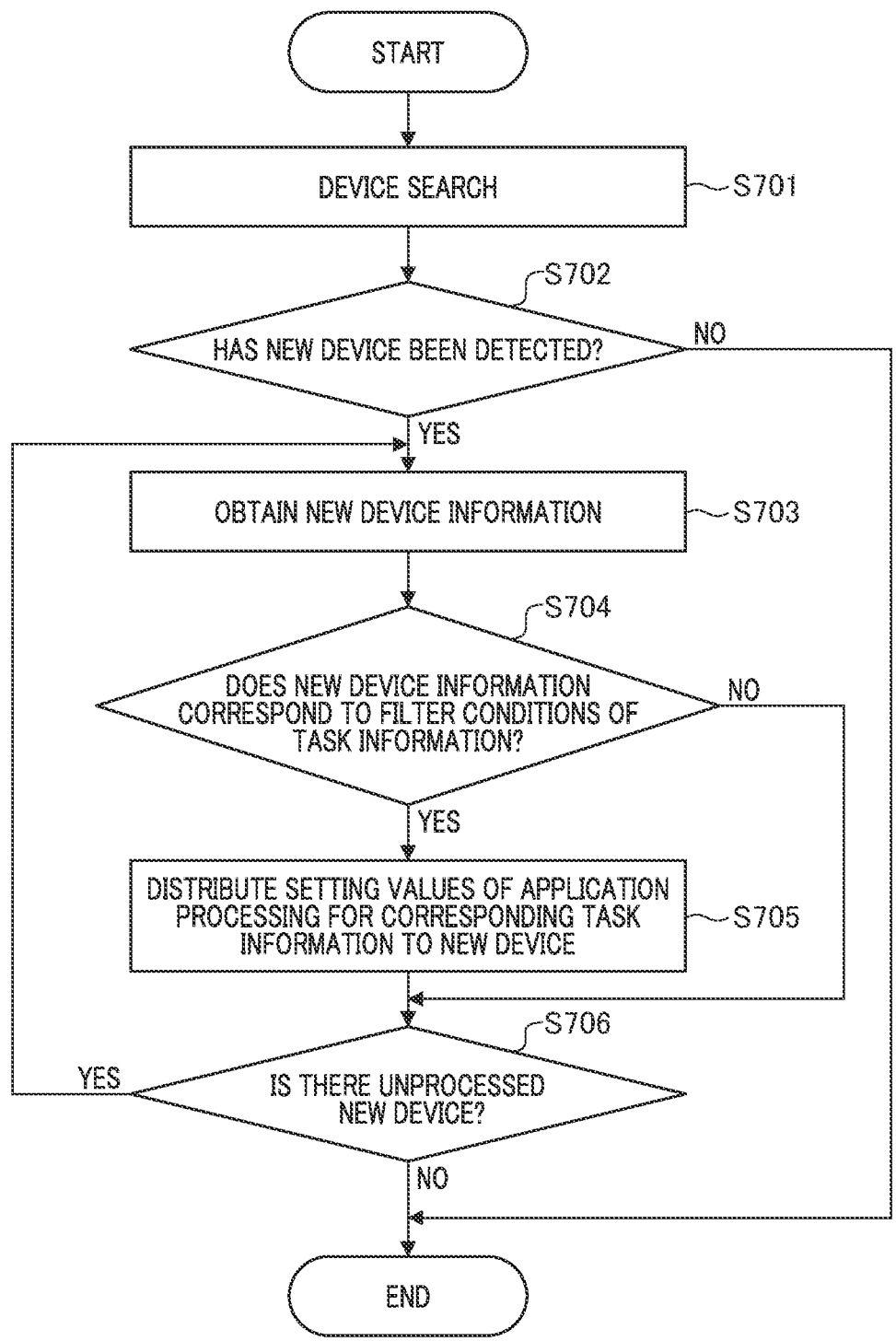
FIG. 8 is a flow chart illustrating an example of the execution process of the subscription device task.

FIG. 8 is a flow chart illustrating an example of the execution processing of the subscription device task. The process of FIG. 8 is executed at the timing of a device search performed by the device search unit 303. The examples of the timing for executing the process in FIG. 8 include when the device management application 300 is started, when an instruction to search the device manually by the user is received, or when the execution time based on the periodic schedule arrives. In the description below, it is assumed that the subscription device task has been registered in the task management unit 302.

In S701, the device search unit 303 executes a device search on the network 102. The device information obtained from the device 101 side during search is a serial number, a model name, and an IP address.

In S702, the device search unit 303 determines whether or not a new device has been detected by the device search. For example, the device search unit 303 collates the device 101 detected by the device search with the device information of the device management unit 301. Subsequently, the device search unit 303 detects the device 101 that is not registered in the device information of the device management unit 301 as a new device. If a new device has been detected, the process proceeds to S703. In contrast, if a new device has not been detected, the process of FIG. 8 ends.

In S703, the device search unit 303 uses any of the one or more new devices detected in S702 as a device to be processed. Subsequently, the device search unit 303 obtains the device information (a serial number, a model name, and an IP address) of the new device to be processed.

In S704, the device search unit 303 obtains the task information of the subscription device task from the task management unit 302. Subsequently, the device search unit 303 determines whether or not the device information of the new device corresponds to the filter conditions of the subscription device task. Specifically, the device search unit 303 determines whether or not the model name of the new device matches the model name filter of the task information, and whether or not the IP address of the new device matches the IP address filter of the task information.

If the device information of the new device corresponds to the filter conditions of the subscription device task, the process proceeds to S705. In contrast, if the device information of the new device does not correspond to the filter conditions of the subscription device task, the process proceeds to S706.

In S705, the device search unit 303 obtains the application processing information linked to the application processing ID from the task management unit 302 by using the application processing ID of the subscription device task corresponding to the filter conditions. Subsequently, the device search unit 303 distributes the information about the node name, the IP address, the location, and the contact included in the application processing information to the new device to be processed to serve as a setting information request.

When the new device receives the setting information request distributed in S705, the new device updates its own device information by using the received information about the node name, the IP address, the location, and the contact. Thus, it is possible to facilitate the initial settings of the device information of the replaced subscription device when the subscription device is replaced.

In S706, the device search unit 303 determines whether or not an unprocessed new device that has not been a target for processing still exists among the new devices that have been detected in S702. If an unprocessed new device exists, the process returns to S703 and the device search unit 303 changes a new device to be processed and repeats the above process. In contrast, if an unprocessed new device does not exist, the process of FIG. 8 ends. The description of FIG. 8 ends here.

As described above, the device management application 300 of the PC 100 has the screen display unit 306 and the device search unit 303. The screen display unit 306 provides the subscription device filter setting screen 410 and the device setting screen 500. On the subscription device filter setting screen 410, filter conditions can be determined based on the contract object model name 413 corresponding to the subscription contract. On the device setting screen 500, the application processing information to be distributed when a new device specified by the filter condition is detected can be determined. The device search unit 303 searches the device 101 via the network 102. The device management application 300 distributes the information included in the application processing information according to the detection when a new device corresponding to the filter conditions has been detected by the search of the device 101 ("YES" in S704) (S705).

According to the present embodiment, the subscription device task for performing the initial settings of the subscription device when the subscription device is newly detected can be set in advance via the subscription device filter setting screen 410 and the device setting screen 500. During search for the device 101, the device management application 300 can automatically execute a setting operation when the faulty device is replaced with an alternative device of the subscription device, by using the subscription device task. As a result, in the present embodiment, the load of the setting operation caused when the failed device is replaced with the alternative device of the subscription device can be significantly reduced. Additionally, in the present embodiment, since, during search for the device 101, the process of acquiring the information from the subscription device before replacement is not required, the setting operation during replacement is not hindered even when a faulty device is not present on the network 102.

Additionally, the model name of the filter condition can be set in the subscription device filter setting screen 410 in the present embodiment based on the contract number of the subscription device. In the device setting screen 500, the setting information to be distributed can be obtained from the active contract device. This can facilitate the registration of the subscription device task so that the complexity of the initial settings for the alternative device can be further reduced.

Modification of the Embodiment

In the above embodiment, an example in which the device 101 is an image forming apparatus has been described. However, the device 101 of the present disclosure may be a network device that is managed by the PC 100 and is the object of a subscription contract, and the type of the device is not necessarily limited to the image forming apparatus.

Although, in the above embodiment, an example in which the logical product of the model name filter and the IP address filter are applied to serve as the device specific information has been described, only the model name filter may be applied to serve as the device specific information.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-108371, filed Jun. 24, 2020, which is hereby incorporated by reference herein in its entirety.

What is claimed is:

1. A device management apparatus comprising:
at least one memory storing instructions; and
one or more processors configured to execute the instructions, which when executed by the one or more processors, cause the device management apparatus to:
receive a first designation for determining device specific information corresponding to a contract;
receive a second designation related to setting information to be distributed if a new device specified by the device specific information is detected;
search a device via a network; and
distribute, based on the second designation, the setting information to a device that has been newly found by a searching, after the reception of the second designation, on the network and that is specified by the device specific information determined by the first designation.

2. The device management apparatus according to claim 1,
wherein the first designation and the second designation are received by using wizard-type user interfaces.

3. The device management apparatus according to claim 1,
wherein the new device specified by the device specific information is a second device replaced from a first device that is the object of the contract corresponding to the device specific information.

4. The device management apparatus according to claim 3,
wherein, based on the second designation, the setting information to be distributed has been obtained from the first device operating on the network.

5. The device management apparatus according to claim 1,
wherein the first designation is a contract number corresponding to the contract.

6. The device management apparatus according to claim 1,
wherein an IP address can be specified as a detection condition of the new device in addition to the device specific information.

7. The device management apparatus according to claim 1,
wherein the distributed setting information is information used for updating the setting information in the new device and includes at least any one of information about a name, information about an IP address of a device, and contact information for the device.

8. A method comprising:
receiving a first designation for determining device specific information corresponding to a contract;
receiving a second designation related to setting information to be distributed if a new device specified by the device specific information is detected;
searching a device via a network; and
distributing, based on the second designation, the setting information to a device that has been newly found by a searching, after the reception of the second designation, on the network and that is specified by the device specific information determined by the first designation.

9. A non-transitory storage medium on which is stored a computer program for making a computer of a device management apparatus perform operations comprising:
receiving a first designation for determining device specific information corresponding to a contract;
receiving a second designation related to setting information to be distributed if a new device specified by the device specific information is detected;
searching a device via a network; and
distributing, based on the second designation, the setting information to a device that has been newly found by a searching, after the reception of the second designation, on the network and that is specified by the device specific information determined by the first designation.

10. A device management apparatus comprising:
at least one memory storing instructions; and
one or more processors configured to execute the instructions, which when executed by the one or more processors, cause the device management apparatus to:
receive a first designation for determining device specific information corresponding to a contract;
receive a second designation related to setting information to be distributed;
obtain, in response to the reception of the second designation, setting information of a first device;
search a device via a network after the reception of the first designation and the second designation; and
distribute the obtained setting information to a second device that has been newly found by a searching on the network and that is specified by the device specific information determined by the first designation,
wherein the second device has replaced from the first device.

11. A method for a device management apparatus, the method comprising:
- receiving a first designation for determining device specific information corresponding to a contract;
- receiving a second designation related to setting information to be distributed;
- obtaining, in response to the reception of the second designation, setting information of a first device;
- searching a device via a network after the reception of the first designation and the second designation; and
- distributing the obtained setting information to a second device that has been newly found by a searching on the network and that is specified by the device specific information determined by the first designation,
- wherein the second device has replaced from the first device.

* * * * *